US012146806B2

(12) United States Patent
Kim

(10) Patent No.: US 12,146,806 B2
(45) Date of Patent: Nov. 19, 2024

(54) APPARATUS FOR ESTIMATING ROAD PROFILE AND METHOD THEREOF

(71) Applicant: HYUNDAI MOBIS CO., LTD., Seoul (KR)

(72) Inventor: Cheol Joong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 261 days.

(21) Appl. No.: 17/969,127

(22) Filed: Oct. 19, 2022

(65) Prior Publication Data
US 2023/0130001 A1   Apr. 27, 2023

(30) Foreign Application Priority Data
Oct. 21, 2021   (KR) .................. 10-2021-0140910

(51) Int. Cl.
G01M 1/12   (2006.01)
G01B 11/24   (2006.01)
G01B 21/08   (2006.01)

(52) U.S. Cl.
CPC ............. *G01M 1/122* (2013.01); *G01B 11/24* (2013.01); *G01B 21/08* (2013.01)

(58) Field of Classification Search
CPC .. G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12;
(Continued)

(56) References Cited

U.S. PATENT DOCUMENTS 11,110,770 B2 *  9/2021  Kim .................... B60G 17/018
11,801,726 B2 * 10/2023  Sridhar ................ B60G 21/08
(Continued)

FOREIGN PATENT DOCUMENTS

CN   114049294 A  *  2/2022 ......... G06F 18/2135
EP    1386807 A1  *  2/2004 ......... B60G 17/0162
(Continued)

Primary Examiner — Andre J Allen
(74) Attorney, Agent, or Firm — NSIP Law

(57) ABSTRACT

Disclosed is an apparatus and method for estimating a road profile for a vehicle. The apparatus includes a camera, processors, and a controller. The processors are configured to obtain a state of the vehicle including a behavior of the vehicle, and obtain a road height from information provided by the camera. The controller is configured to estimate the road profile by changing coordinates of the camera according to the behavior of the vehicle based on a vehicle height, compensating for the road height and a recognition road distance, and matching and filtering multiple road heights.

9 Claims, 6 Drawing Sheets

(58) Field of Classification Search
CPC .......... G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06; B60G 2204/113; B60G 2400/52; B60G 17/019; B60G 2204/115; B60G 2204/11; B60G 17/0165; B60G 2800/702; B60G 2400/252; B60G 2400/208; B60G 2400/91; B60G 2400/822; B60G 2400/204; B60G 2400/821; B60G 2800/70; B60G 2400/82; B60G 2600/02; B60G 2800/92; B60G 17/0195; B60G 2206/99; B60G 2800/984; B60G 2400/61; B60G 2401/12; B60G 2600/042; B60G 2600/08; B60G 2400/10; B60G 2400/64; B60G 2400/8222; B60G 2800/21; B60G 2800/22; B60G 17/0523; B60G 2200/144; B60G 2200/46; B60G 2400/104; B60G 2400/258; B60G 2400/41; B60G 2400/70; B60G 2401/00; B60G 2500/10; B60G 2500/30; B60G 2600/16; B60G 2800/012; B60G 2800/182; B60G 2800/80; B60G 2200/21; B60G 2206/20; B60G 2400/102; B60G 2400/206; B60G 2401/122; B60G 2600/60; B60G 2800/916; B60G 2800/94; B60G 11/27; B60G 17/00; B60G 17/0155; B60G 17/0161; B60G 17/0162; B60G 17/018; B60G 17/0185; B60G 17/01908; B60G 17/01933; B60G 17/0275; B60G 21/051; B60G 2200/20; B60G 2200/462; B60G 2202/135; B60G 2202/25; B60G 2204/143; B60G 2204/149; B60G 2204/41; B60G 2204/4302; B60G 2204/4402; B60G 2204/8102; B60G 2206/0114; B60G 2206/50; B60G 2300/026; B60G 2300/07; B60G 2300/082; B60G 2400/0511; B60G 2400/052; B60G 2400/106; B60G 2400/256; B60G 2400/34; B60G 2400/39; B60G 2400/50; B60G 2400/51222; B60G 2400/60; B60G 2400/71; B60G 2400/824; B60G 2400/90; B60G 2401/10; B60G 2401/14; B60G 2401/17; B60G 2401/21; B60G 2500/20; B60G 2500/2012; B60G 2500/32; B60G 2500/40; B60G 2600/0422; B60G 2600/044; B60G 2600/082; B60G 2600/12; B60G 2600/14; B60G 2600/70; B60G 2800/0122; B60G 2800/0194; B60G 2800/164; B60G 2800/214; B60G 2800/802; B60G 2800/90; B60G 2800/9124; B60G 2800/614; B60G 2800/93; B60G 2800/95; B60G 2202/152; B60G 2600/188; B60G 2600/604; B60G 2800/162; B60W 2040/1315; B60W 2420/403; B60W 2520/16; B60W 2520/18; B60W 2530/201; B60W 2552/20; B60W 2552/35; B60W 2556/20; B60W 40/06; G01B 11/24; G01B 21/08

See application file for complete search history.

(56) References Cited

U.S. PATENT DOCUMENTS

| | | | | |
|---|---|---|---|---|
| 12,059,937 | B2* | 8/2024 | Boon | B60G 21/103 |
| 2004/0064237 | A1* | 4/2004 | Lu | B60T 8/175 |
| | | | | 340/440 |
| 2004/0162654 | A1* | 8/2004 | Lu | B60G 17/0162 |
| | | | | 180/282 |
| 2006/0041367 | A1* | 2/2006 | Ono | B60T 8/172 |
| | | | | 701/75 |
| 2024/0248198 | A1* | 7/2024 | Doerr | B60W 40/06 |
| 2024/0270257 | A1* | 8/2024 | Keidel | B60W 50/0097 |

FOREIGN PATENT DOCUMENTS

| | | | | |
|---|---|---|---|---|
| EP | 3107068 A1 | * | 12/2016 | ......... B60G 17/0165 |
| JP | 3129509 U | * | 2/2007 | |
| WO | WO-2022255963 A1 | * | 12/2022 | ........... G06V 20/588 |

* cited by examiner

APPARATUS FOR ESTIMATING ROAD PROFILE AND METHOD THEREOF

CROSS-REFERENCE TO RELATED APPLICATION

This application claims the benefit under 35 USC § 119(a) of Korean Patent Application No. 10-2021-0140910, filed on Oct. 21, 2021, in the Korean Intellectual Property Office, the entire disclosure of which is incorporated herein by reference for all purposes.

BACKGROUND

1. Field

The present disclosure relates to an apparatus and method for estimating a road profile.

2. Description of Related Art

Generally, when a vehicle drives on a road surface that is uneven, such as a speed bump, an unpaved road, or a pothole, the undercarriage (for example, the bottom, etc.) of the vehicle may be scratched or an accident may occur due to an impact or vibration.

Vehicles are known to have suspensions installed to prevent damage and/or an accident for a vehicle body, a passenger, or cargo and improve a ride comfort of the vehicle by controlling vibration or an impact from a road while the vehicle drives so that the vibration or impact is not directly transferred to the vehicle body. The suspension (or suspension apparatus) is an apparatus which is installed connected to the axle of the vehicle. The suspension can include a chassis spring for reducing an impact from a road, a shock absorber for improving a ride comfort by controlling free vibration of the chassis spring, a stabilizer bar for preventing the rolling of a vehicle, etc.

Recently, an electronic controlled suspension (ECS) for automatically adjusting the strength of the suspension based on driving conditions or a road state has been introduced. The ECS can be mounted on the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus for estimating a road profile for a vehicle. The apparatus includes cameras, processors, and a controller. The processors are configured to obtain a state of the vehicle including a behavior of the vehicle, and obtain a road height from information provided by the cameras. The controller is configured to estimate the road profile by changing coordinates of the cameras according to the behavior of the vehicle based on a vehicle height, compensating for the road height and a recognition road distance, and matching and filtering multiple road heights.

The controller may be configured to calculate the recognition road distance recognized through the cameras, based on a center of gravity of the vehicle calculated based on the vehicle height and a pitch angle of the vehicle, change the coordinates of the cameras, based on the center of gravity of the vehicle calculated based on the vehicle height and the pitch angle and roll angle of the vehicle, compensate for the road height, based on the coordinates of the cameras changed with respect to the road height recognized through the cameras, left and right vehicle heights of the vehicle, and reliability of the road height, calculate a final recognition road distance and a final road height by matching the multiple road heights and the recognition road distance, and filter the final recognition road distance and the final road height.

The processors may be further configured to calculate the center of gravity of the vehicle by averaging vehicle heights of respective corners of the vehicle.

The processors may be further configured to compensate for the road height by incorporating an average value of left front-wheel and rear-wheel vehicle heights of the vehicle and an average value of right front-wheel and rear-wheel vehicle heights of the vehicle.

The processors may be further configured to calculate the final recognition road distance and the final road height by averaging the multiple road heights and the recognition road distance.

In another general aspect, here is provided a method of estimating a road profile. The method includes receiving, by a controller, a state of a vehicle including a behavior of the vehicle, and a road height, calculating, by the controller, a recognition road distance recognized through a camera, based on a center of gravity of the vehicle calculated based on a vehicle height and a pitch angle of the vehicle, changing, by the controller, coordinates of the camera, based on the center of gravity of the vehicle calculated based on the vehicle height and the pitch angle and a roll angle of the vehicle, compensating for, by the controller, the road height based on the coordinates of the camera changed with respect to the road height recognized through the camera, left and right vehicle heights of the vehicle, and reliability of the road height, calculating, by the controller, a final recognition road distance and a final road height by matching the multiple road heights and the recognition road distance, and filtering, by the controller, the calculated final recognition road distance and final road height.

The method may further include calculating the center of gravity of the vehicle by averaging the vehicle heights of respective corners of the vehicle.

Compensating for of the road height may further include compensating for the road height by incorporating an average value of left front-wheel and rear-wheel vehicle heights of the vehicle and an average value of right front-wheel and rear-wheel vehicle heights of the vehicle.

Calculating the final recognition road distance and the final road height may further include calculating the final recognition road distance and the final road height by averaging the multiple road heights and the recognition road distance.

Other features and aspects will be apparent from the following detailed description, the drawings, and the claims.

DETAILED DESCRIPTION

Figure 1:
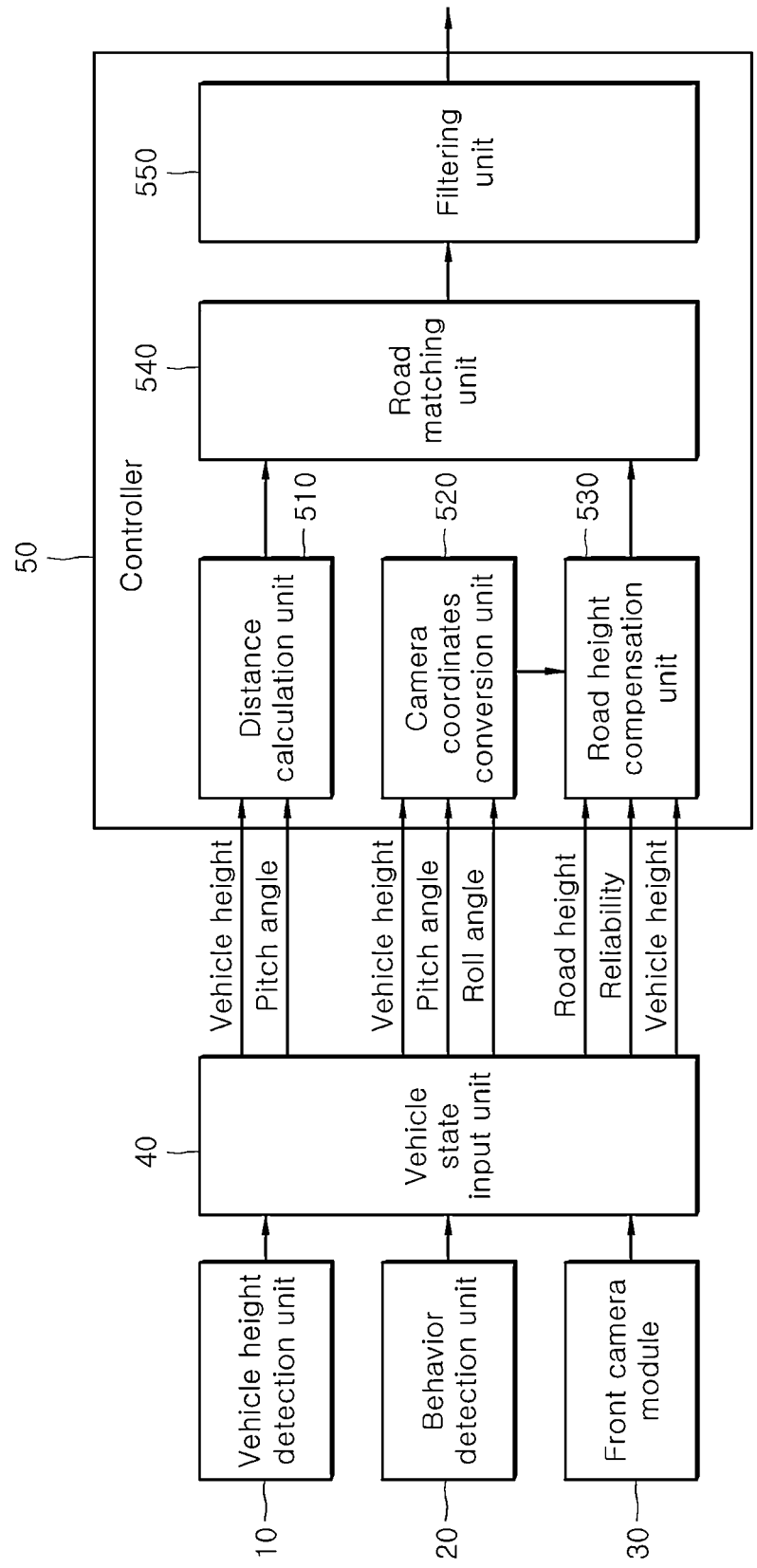
FIG. 1 is a block diagram illustrating an apparatus for estimating a road profile according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
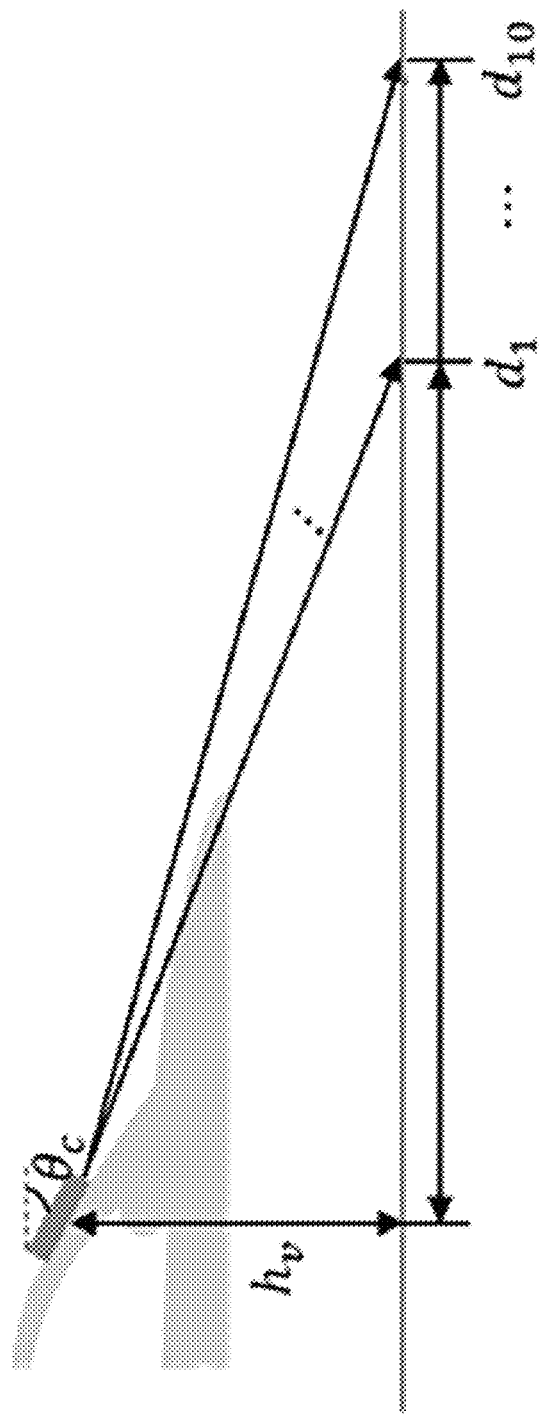
FIG. 2 is an exemplary diagram illustrating the coordinates of a camera installed within a vehicle in the apparatus for estimating a road profile according to an embodiment of the present disclosure.
Figure 3:
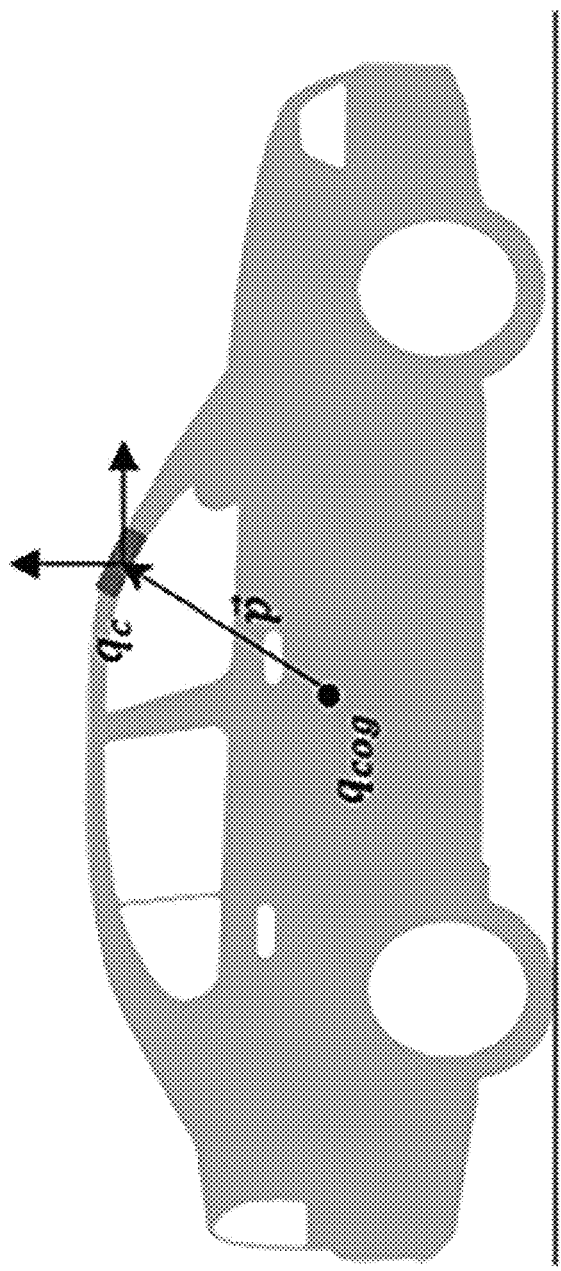
FIG. 3 is a diagram illustrating a recognition road distance in the apparatus for estimating a road profile according to an embodiment of the present disclosure.
Figure 4:
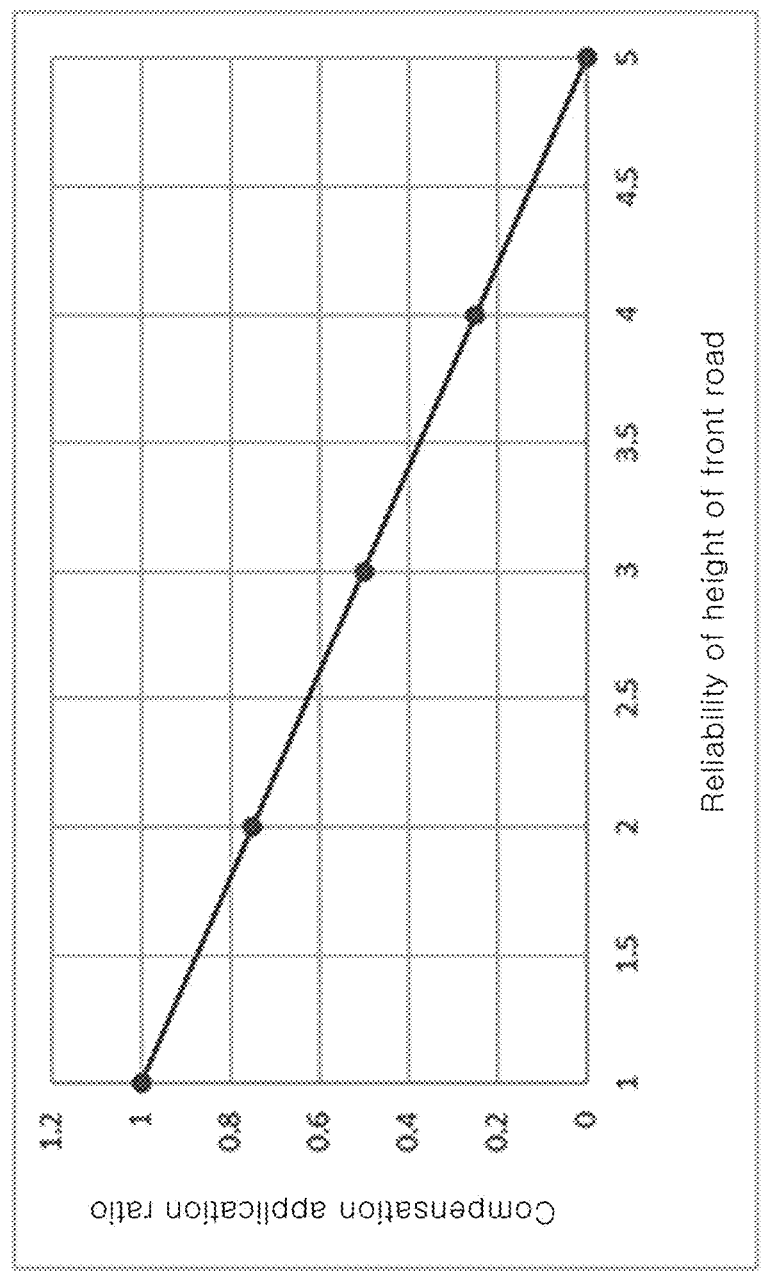
FIG. 4 is an exemplary diagram illustrating a relation between the reliability of road height and road height compensation in the apparatus for estimating a road profile according to an embodiment of the present disclosure.
Figure 5:
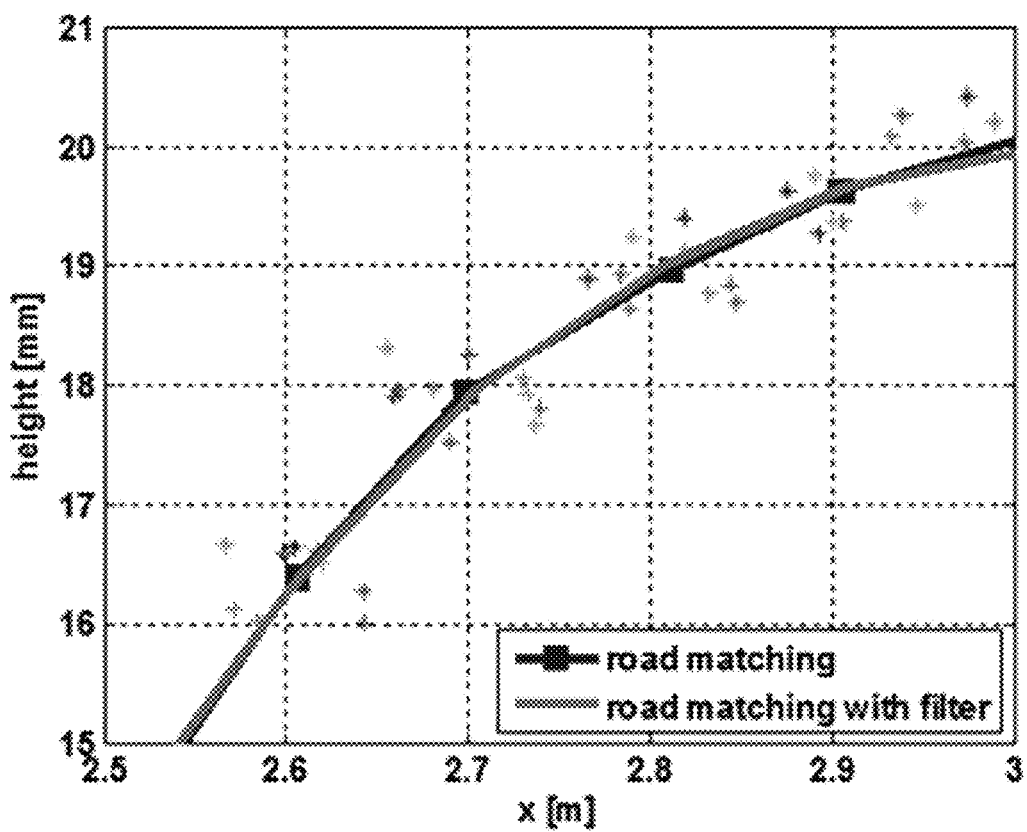
FIG. 5 is a graph illustrating matching and filtering results in the apparatus for estimating a road profile according to an embodiment of the present disclosure.
Figure 6:
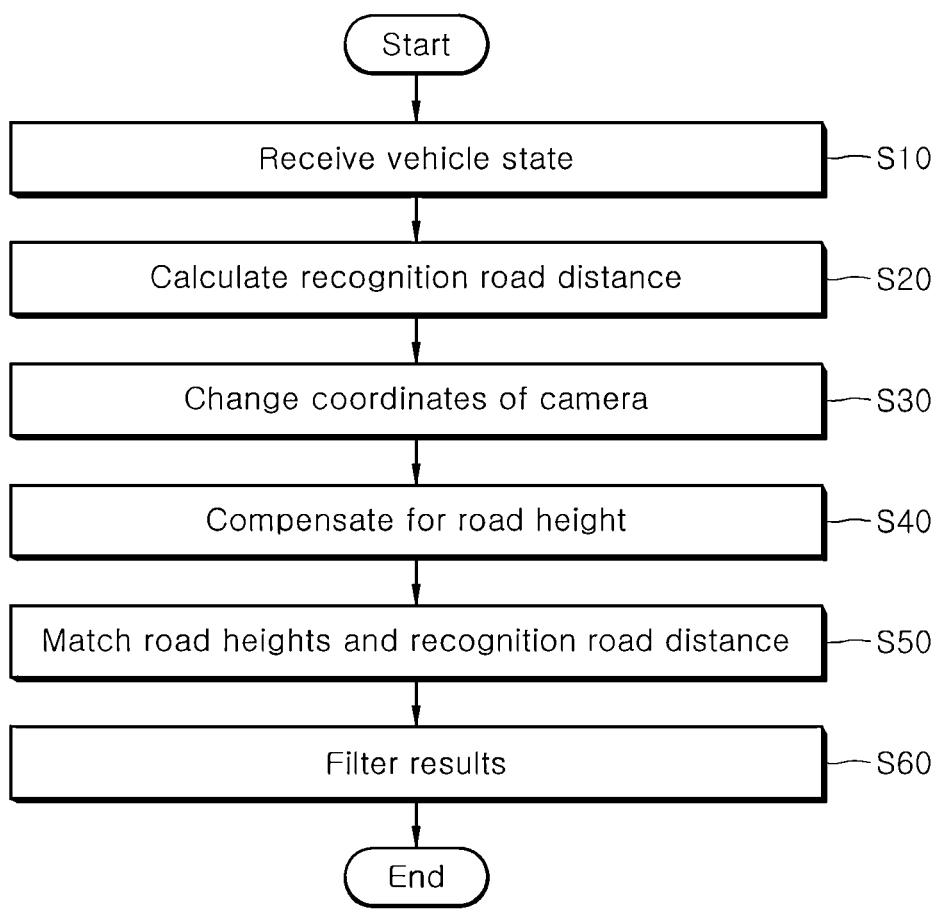
FIG. 6 is a flowchart for describing a method of estimating a road profile according to an embodiment of the present disclosure.

FIG. 1 is a block diagram illustrating an apparatus for estimating a road profile according to an embodiment of the present disclosure. FIG. 2 is an exemplary diagram illustrating the coordinates of a camera installed within a vehicle in the apparatus for estimating a road profile according to an embodiment of the present disclosure. FIG. 3 is a diagram illustrating a recognition road distance in the apparatus for estimating a road profile according to an embodiment of the present disclosure. FIG. 4 is an exemplary diagram illustrating a relation between the reliability of road height and road height compensation in the apparatus for estimating a road profile according to an embodiment of the present disclosure. FIG. 5 is a graph illustrating matching and filtering results in the apparatus for estimating a road profile according to an embodiment of the present disclosure. FIG. 6 is a flowchart for describing a method of estimating a road profile according to an embodiment of the present disclosure.

As illustrated in FIG. 1, the apparatus for estimating a road profile according to an embodiment of the present disclosure may include a vehicle state input unit 40 and a controller 50.

The vehicle state input unit 40 may receive a state of a vehicle (for example, a behavior, current motion, position, etc.) and a road height from a vehicle height detection unit 10 for detecting the vehicle height of each of the wheels of the vehicle, a behavior detection unit 20 for detecting a behavior of the vehicle by measuring a pitch angle and roll angle of the vehicle, and a front camera module 30 for measuring the road height through a camera mounted on an ADAS and calculating the reliability of the road height.

The vehicle height detection unit 10 may detect the vehicle height of each of the wheels of a vehicle in association with a sensor that is installed in the suspension apparatus of each of the wheels and that detects displacement of the suspension apparatus. Alternatively, the vehicle height detection unit 10 may correspond to an electronic control unit (ECU) of the suspension apparatus, and may be constructed to calculate the vehicle height of a vehicle under the control of the vehicle.

The behavior detection unit 20 may be a construction for calculating a pitch angle and roll angle of a vehicle in association with the yaw rate sensor of the vehicle, may be a construction combined with a posture control apparatus (e.g., electronic stability control (ESC)) for controlling a behavior of a vehicle or may be a part of the posture control apparatus.

The front camera module 30 may calculate the height of a road through the camera in association with an ADAS, and may calculate a reliable degree (i.e., reliability) of the calculated height of the road. Such reliability may be a form that is integrated with logic for operating a road height and that provides probability information for to what extent a currently calculated road height can be reliable.

The vehicle state input unit 40 may include a CAN communication unit of a vehicle, and may be constructed to receive data from various electronic devices and/or controllers within the vehicle and transfer the data to the controller 50. In some embodiments, the vehicle state input unit 40 may be implemented in the form of an integrated circuit (IC) that is physically combined and integrated with the controller 50.

The controller 50 may estimate a road profile by changing coordinates of the camera according to a behavior of a vehicle based on a vehicle height received from the vehicle state input unit 40, compensating for a road height and a recognition road distance, and matching and filtering the multiple road heights. The controller 50 may be implemented as an IC, and may be a controller, that is, a kind of ECU of a vehicle.

Furthermore, the controller 50 may be combined with a controller of a suspension apparatus of a vehicle, and may be constructed to incorporate an estimated road profile so that the suspension apparatus is controlled or to transmit the estimated road profile to the controller of the suspension apparatus of the vehicle.

In this case, the controller 50 may include a distance calculation unit 510, a camera coordinates conversion unit 520, a road height compensation unit 530, a road matching unit 540, and a filtering unit 550. Such components may be included in the controller 50 in the form of logic or a circuit that performs each operation.

The distance calculation unit 510 may calculate a recognition road distance that is recognized through the camera, based on the center of gravity of a vehicle calculated based on a vehicle height and a pitch angle of the vehicle.

In this case, the coordinates of the camera installed within the vehicle are changed depending on a behavior of the vehicle because the camera is installed at the front upper part of the vehicle as illustrated in FIG. 2.

In this case, the center of gravity ($q_{cog}$) of the vehicle may be calculated by averaging vehicle heights of respective corners of the vehicle, that is, vehicle heights of the wheels of the vehicle.

Accordingly, as illustrated in FIG. 3, a recognition road distance that is recognized through the camera may be calculated like Equation 1, based on an angle at which the camera is mounted, a height in which the camera is mounted, and a pitch angle (θ) of the vehicle.

$$d_i = h_v \cdot \tan(90 - (\theta_c + \theta + 0.02(i-1))), i = 1, \ldots, 10 \quad \text{[Equation 1]}$$

$d_i$: i-th camera recognition distance
$h_V$: Camera mounting height
$\theta_c$: Camera mounting angle The camera coordinates conversion unit 520 may change coordinates of the camera, based on the center of gravity of the vehicle calculated based on the vehicle height and the pitch angle and roll angle of the vehicle.

That is, as illustrated in FIG. 2, the coordinates of the camera installed at the front upper part of the vehicle may be calculated like Equation 2, based on a distance from the center of gravity of the vehicle to the camera depending on a behavior of the vehicle, a roll angle at the center of gravity of the vehicle, and a pitch angle at the center of gravity of the vehicle.

In this case, the center of gravity ($q_{cog}$) of the vehicle may be calculated by averaging vehicle heights of the respective corners of the vehicle, that is, vehicle heights of the respective wheels of the vehicle.

$$q_c = \begin{bmatrix} x_c \\ y_c \\ z_c \end{bmatrix} = \begin{bmatrix} x_{cog} \\ y_{cog} \\ z_{cog} \end{bmatrix} + \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix} \vec{p} \quad \text{[Equation 2]}$$

$$\vec{p} = \begin{bmatrix} \Delta x \\ \Delta y \\ \Delta z \end{bmatrix}$$

Distance from center of gravity of vehicle to camera
Ø: Roll angle at center of gravity of vehicle
θ: Pitch angle at center of gravity of vehicle The road height compensation unit 530 may compensate for a road height based on the coordinates of the camera changed with respect to the road height recognized through the camera, left and right vehicle heights of the vehicle, and reliability of the road height.

That is, the road height compensation unit 530 may compensate for the road height based on the relation graph between the reliability of the road height and road height compensations, which is illustrated in FIG. 4, by using the reliability of the road height received from the front camera module 30 and the coordinates of the camera according to the behavior of the vehicle.

In this case, when the reliability of the road height is high, a compensation application ratio may be reduced because the accuracy of the road height received from the front camera module 30 is high. When the reliability of the road height is low, the compensation application ratio for the road height according to the behavior of the vehicle may be increased. That is, a tuning parameter may be set so that the reliability of the road height and the degree of compensation for the road height have an inverse relationship.

As described above, the road height compensation unit 530 may divide the compensated road height into road heights on the left side and right side of the vehicle as in Equation 3, and may compensate for the road heights on the left side and the right side. Accordingly, a value that is changed by incorporating an average value of left front-wheel and rear-wheel vehicle heights of the vehicle and an average value of right front-wheel and rear-wheel vehicle heights of the vehicle may also be applied to the height in which the camera is mounted.

$$H_{Li}=h_{Li}+\alpha_{Li}(-h_v+y_c+z_c)\beta, i=1,\ldots,10$$

$$H_{Ri}=h_{Ri}+\alpha_{Ri}(-h_v-y_c+z_c)\beta, i=1,\ldots,10$$

$$\alpha_i=(-1.256C_i+6.25)\times 0.2 \quad \text{[Equation 3]}$$

$H_i$: Compensated road height (i-th)
$h_i$: Road height (i-th) received through camera
$h_v$: Camera mounting height
$C_i$: Road height reliability (1 to 5)
β: Road compensation degree (tuning parameter)

The road matching unit 540 may calculate the final recognition road distance and the final road height by matching the multiple road heights and the recognition road distance measured by the road height compensation unit 530 and the distance calculation unit 510.

That is, the road matching unit 540 may average the road heights and the recognition road distance for multiple points received from the front camera module 30 as in Equation 4, and may match the average road height and the averaged recognition road distance as one final road height and one final recognition road distance.

$$D = \frac{\sum_{i=1}^{10} d_i}{10}, H_L = \frac{\sum_{i=1}^{10} H_{Li}}{10}, H_R = \frac{\sum_{i=1}^{10} H_{Ri}}{10} \quad \text{[Equation 4]}$$

The filtering unit 550 may filter the final recognition road distance and final road height calculated by the road matching unit 540 in the form of a smooth signal as illustrated in FIG. 5. Accordingly, suspension performance of a vehicle can be improved when a suspension apparatus in the rear end of the vehicle uses a road profile.

As described above, according to the apparatus for estimating a road profile according to an embodiment of the present disclosure, suspension performance of a vehicle can be improved by improving the accuracy of a road profile in front of the vehicle in a way to estimate the road profile by incorporating a behavior of the vehicle according to the driving of the vehicle into information on a road height that is estimated from an image in front of the vehicle, which is received through a camera.

FIG. 6 is a flowchart for describing a method of estimating a road profile according to an embodiment of the present disclosure.

As illustrated in FIG. 6, in the method of estimating a road profile according to an embodiment of the present disclosure, first, the controller 50 receives a state of a vehicle and a road height through the vehicle state input unit 40 (S10).

The controller 50 may receive the state of the vehicle and the road height from the vehicle height detection unit 10 for detecting the vehicle height of each of the wheels of the vehicle, the behavior detection unit 20 for detecting a behavior of the vehicle by measuring a pitch angle and roll angle of the vehicle, and the front camera module 30 for measuring the road height through a camera mounted on an ADAS and calculating the reliability of the road height.

Furthermore, the controller 50 may also receive the reliability of the road height from the front camera module 30 along with the road height.

After receiving the state of the vehicle and the road height in step S10, the controller 50 calculates a recognition road distance that is recognized through the camera, based on the center of gravity of the vehicle calculated based on the vehicle height and a pitch angle of the vehicle (S20).

In this case, the coordinates of the camera installed within the vehicle are changed depending on a behavior of the vehicle because the camera is installed at the front upper part of the vehicle as illustrated in FIG. 2.

In this case, the center of gravity ($q_{cog}$) of the vehicle may be calculated by averaging vehicle heights of the respective corners of the vehicle, that is, vehicle heights of the respective wheels of the vehicle.

Accordingly, as illustrated in FIG. 3, a recognition road distance that is recognized through the camera may be calculated like Equation 5, based on an angle at which the camera is mounted, a height in which the camera is mounted, and a pitch angle of the vehicle.

$$d_i=h_v \cdot \tan(90-(\theta_c+\theta+0.02(i-1)), i=1,\ldots,10 \quad \text{[Equation 5]}$$

$d_i$: i-th camera recognition distance
$h_v$: Camera mounting height
$\theta_c$: Camera mounting angle Furthermore, the controller 50 changes the coordinates of the camera, based on the center of gravity of the vehicle calculated based on the received vehicle height and the pitch angle and roll angle of the vehicle (S30).

That is, as illustrated in FIG. 2, the coordinates of the camera installed at the front upper part of the vehicle may be calculated like Equation 6, based on a distance from the center of gravity of the vehicle to the camera depending on a behavior of the vehicle, a roll angle at the center of gravity of the vehicle, and a pitch angle at the center of gravity of the vehicle.

In this case, the center of gravity ($q_{cog}$) of the vehicle may be calculated by averaging vehicle heights of the respective corners of the vehicle, that is, vehicle heights of the respective wheels of the vehicle.

$$q_c = \begin{bmatrix} x_c \\ y_c \\ z_c \end{bmatrix} = \begin{bmatrix} x_{cog} \\ y_{cog} \\ z_{cog} \end{bmatrix} + \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix} \vec{p} \quad \text{[Equation 6]}$$

$$\vec{p} = \begin{bmatrix} \Delta x \\ \Delta y \\ \Delta z \end{bmatrix}$$

Distance from center of gravity of vehicle to camera
Ø: Roll angle at center of gravity of vehicle
θ: Pitch angle at center of gravity of vehicle After changing the coordinates of the camera based on the behavior of the vehicle in step S30, the controller 50 compensates for the road height, based on the coordinates of the camera changed with respect to the road height recognized through the camera, left and right vehicle heights of the vehicle, and the reliability of the road height (S40).

That is, the controller 50 may compensate for the road height based on the relation graph between the reliability of the road height and road height compensations, which is illustrated in FIG. 4, by using the reliability of the road height received from the front camera module 30 and the coordinates of the camera according to the behavior of the vehicle.

In this case, when the reliability of the road height is high, a compensation application ratio may be reduced because the accuracy of the road height received from the front camera module 30 is high. When the reliability of the road height is low, the compensation application ratio for the road height according to the behavior of the vehicle may be increased. That is, a tuning parameter may be set so that the reliability of the road height and the degree of compensation for the road height have an inverse relationship.

As described above, the controller 50 may divide the compensated road height into road heights on the left side and right side of the vehicle as in Equation 7, and may compensate for the road heights on the left side and the right side. Accordingly, a value that is changed by incorporating an average value of left front-wheel and rear-wheel vehicle heights of the vehicle and an average value of right front-wheel and rear-wheel vehicle heights of the vehicle may also be applied to the height in which the camera is mounted.

$$H_{Li} = h_{Li} + \alpha_{Li}(-h_v + y_c + z_c)\beta, i=1, \ldots, 10$$

$$H_{Ri} = h_{Ri} + \alpha_{Ri}(-h_v - y_c + z_c)\beta, i=1, \ldots, 10$$

$$\alpha_i = (-1.256 C_i + 6.25) \times 0.2 \quad \text{[Equation 7]}$$

$H_i$: Compensated road height (i-th)
$h_i$: Road height (i-th) received through camera
$h_v$: Camera mounting height
$C_i$: Road height reliability (1 to 5)
$\beta$: Road compensation degree (tuning parameter)

After compensating for the road height in step S40, the controller 50 calculates the final recognition road distance and the final road height by matching the multiple road heights and the recognition road distance (S50).

That is, the controller 50 may average the road heights and recognition road distance for multiple points received from the front camera module 30 as in Equation 8, and may match the average road height and the averaged recognition road distance as one final road height and one final recognition road distance.

$$D = \frac{\sum_{i=1}^{10} d_i}{10}, H_L = \frac{\sum_{i=1}^{10} H_{Li}}{10}, H_R = \frac{\sum_{i=1}^{10} H_{Ri}}{10} \quad \text{[Equation 8]}$$

The controller 50 filters the final recognition road distance and final road height that have been matched and calculated in step S50 in the form of a smooth signal as illustrated in FIG. 5 (S60). Accordingly, suspension performance of a vehicle can be improved when a suspension apparatus in the rear end of the vehicle uses a road profile.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

An aspect of the present disclosure provides a method of estimating a road profile that may thereby improve suspension performance of a vehicle by improving the accuracy of a road profile in front of the vehicle. The method may estimate the road profile by incorporating a behavior of the vehicle according to the driving of the vehicle into information on a road height that is estimated from an image in front of the vehicle, which is received through a camera.

An aspect of the present disclosure may provide an ECS apparatus that applies a method of adjusting damping by confirming the type of obstacle in a road in front of a vehicle through a camera, a method of obtaining a road profile at a corresponding location based on a global positioning system (GPS) and adjusting damping based on the obtained road profile, or a method of adjusting a damping characteristic by confirming the type and location of an obstacle through a camera and a GPS.

Aspects of the present disclosure provide a technology for estimating a front road profile by using a camera that enables greater ride comfort for a user by using a front road profile, estimated through the camera, in the ECS apparatus.

Aspects of the present disclosure improve the accuracy of the road profile by incorporating the behavior of the vehicle in estimating the road profile into information on a road height that is estimated from an image in front of the vehicle, which is received through a camera. The accuracy of the road profile estimated by using the camera is thereby greatly improved and provides a major positive impact (including reduction of impact) on suspension control performance.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for estimating a road profile for a vehicle, comprising:
   at least one camera;
   one or more processors configured to
      obtain a state of the vehicle including a behavior of the vehicle, and obtain a road height from information provided by the at least one camera; and a controller configured to estimate the road profile by changing coordinates of the at least one camera according to the behavior of the vehicle based on a vehicle height, compensating for the road height and a recognition road distance, and matching and filtering multiple road heights.

2. The apparatus of claim 1, wherein the controller is further configured to:

calculate the recognition road distance recognized through the at least one camera, based on a center of gravity of the vehicle calculated based on the vehicle height and a pitch angle of the vehicle;

change the coordinates of the at least one camera, based on the center of gravity of the vehicle calculated based on the vehicle height and the pitch angle and roll angle of the vehicle;

compensate for the road height, based on the coordinates of the at least one camera changed with respect to the road height recognized through the at least one camera, left and right vehicle heights of the vehicle, and reliability of the road height;

calculate a final recognition road distance and a final road height by matching the multiple road heights and the recognition road distance; and filter the final recognition road distance and the final road height.

3. The apparatus of claim 2, wherein the one or more processors are further configured to calculate the center of gravity of the vehicle by averaging vehicle heights of respective corners of the vehicle.

4. The apparatus of claim 2, wherein the one or more processors are further configured to compensate for the road height by incorporating an average value of left front-wheel and rear-wheel vehicle heights of the vehicle and an average value of right front-wheel and rear-wheel vehicle heights of the vehicle.

5. The apparatus of claim 2, wherein the one or more processors are further configured to calculate the final recognition road distance and the final road height by averaging the multiple road heights and the recognition road distance.

6. A method of estimating a road profile, comprising:

receiving, by a controller, a state of a vehicle including a behavior of the vehicle and a road height;

calculating, by the controller, a recognition road distance recognized through at least one camera, based on a center of gravity of the vehicle calculated based on a vehicle height and a pitch angle of the vehicle;

changing, by the controller, coordinates of the at least one camera, based on the center of gravity of the vehicle calculated based on the vehicle height and the pitch angle and a roll angle of the vehicle;

compensating for, by the controller, the road height based on the coordinates of the camera changed with respect to the road height recognized through the at least one camera, left and right vehicle heights of the vehicle, and reliability of the road height;

calculating, by the controller, a final recognition road distance and a final road height by matching the multiple road heights and the recognition road distance; and filtering, by the controller, the calculated final recognition road distance and final road height.

7. The method of claim 6, further comprising:

calculating the center of gravity of the vehicle by averaging the vehicle heights of respective corners of the vehicle.

8. The method of claim 6, wherein compensating for the road height further comprises:

compensating for the road height by incorporating an average value of left front-wheel and rear-wheel vehicle heights of the vehicle and an average value of right front-wheel and rear-wheel vehicle heights of the vehicle.

9. The method of claim 6, wherein calculating the final recognition road distance and the final road height further comprises:

calculating the final recognition road distance and the final road height by averaging the multiple road heights and the recognition road distance.

* * * * *